(12) United States Patent
Maresh et al.

(10) Patent No.: US 7,480,968 B2
(45) Date of Patent: Jan. 27, 2009

(54) TAMPER EVIDENT FEATURE FOR PACKAGE FASTENING CLIPS

(75) Inventors: Mark Edmund Maresh, Phoenix, AZ (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/279,166

(22) Filed: Apr. 10, 2006

(65) Prior Publication Data
US 2007/0234531 A1    Oct. 11, 2007

(51) Int. Cl.
*A44B 17/00*    (2006.01)

(52) U.S. Cl. .................. 24/453; 24/614; 24/704.2

(58) Field of Classification Search ............... 24/453, 24/297, 614, 618, 625, 662, 704.2
See application file for complete search history.

(56) References Cited

U.S. PATENT DOCUMENTS

| 4,786,225 | A | * | 11/1988 | Poe et al. ............... 411/32 |
| 6,024,223 | A | | 2/2000 | Ritter |
| 6,412,153 | B1 | | 7/2002 | Khachadourian et al. |
| 7,240,406 | B1 | * | 7/2007 | Liverman et al. ........... 24/614 |

* cited by examiner

*Primary Examiner*—James R Brittain
(74) *Attorney, Agent, or Firm*—Daniel E. McConnell; Mark E. McBurney

(57) ABSTRACT

A product package clip has tamper evident protection which is formed integrally with the clip. Breakage of frangible connectors indicates that the clip, and thus the package, has been the target of tampering.

4 Claims, 3 Drawing Sheets

TAMPER EVIDENT FEATURE FOR PACKAGE FASTENING CLIPS

FIELD AND BACKGROUND OF INVENTION

This invention relates to fastener clips for product packaging. In particular, this invention is an improvement over the clip shown and described in Khachadourian et al U.S. Pat. No. 6,412,153, owned in common with the invention described here and hereby incorporated by reference into this disclosure.

As the prior art clip has been widely and successfully used, efforts have been made to assure that product packages secured together by the clip will show evidence of tampering. That has been done heretofore by applying tape over a clip inserted into cardboard panels of a product package, to show by removal or breaking of the tape that an attempt has been made to access the package. If such a package is transported and arrives at a destination with the tape broken or removed, then it is evident that the package has been tampered with en route and appropriate steps can be taken.

Heretofore, such tamper evident precautions have been taken with a single clip in a product package. This choice has been made due to the time and material costs of applying the indicative tape and a belief that a single instance would be a sufficient indicator. Those assumptions have now come into question and a beneficial solution found.

SUMMARY OF THE INVENTION

The present invention provides a tamper evident protection which is formed integrally with the clip, and thus will be present for all clips used in a product package and while avoiding the additional costs of prior practices. In realizing this invention, a latch portion of the clip is provided with frangible connectors joining the latch portion to other portions of the clip. Breakage of the frangible connectors indicates that the clip, and thus the package, has been the target of tampering.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
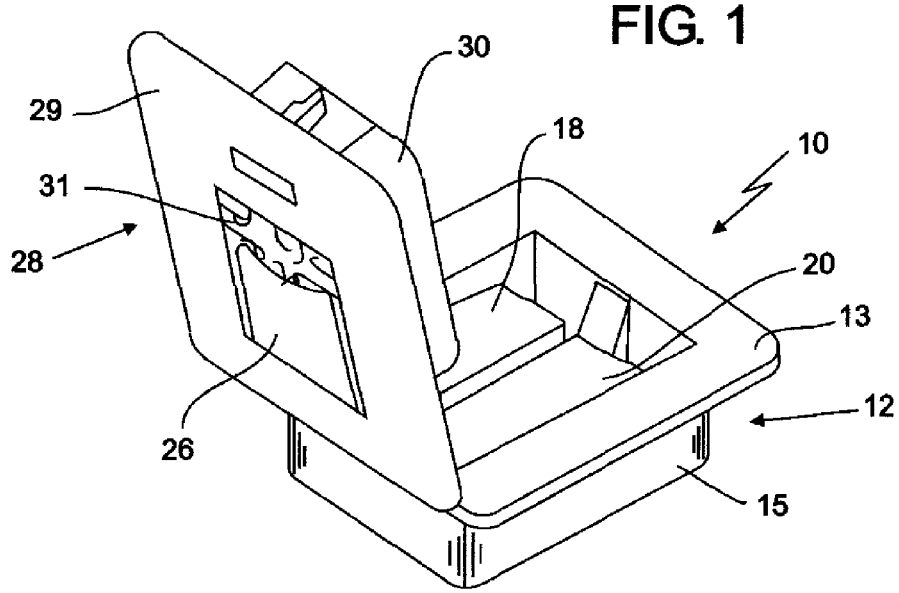
FIG. 1 is a perspective view of a first embodiment of the clip in accordance with this invention.
Figure 2:
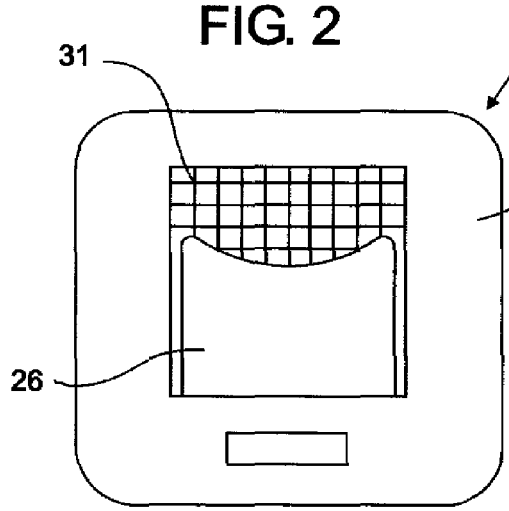
FIG. 2 is an elevation view of the clip of FIG. 1 showing a clip which has not been the subject of tampering.
Figure 3:
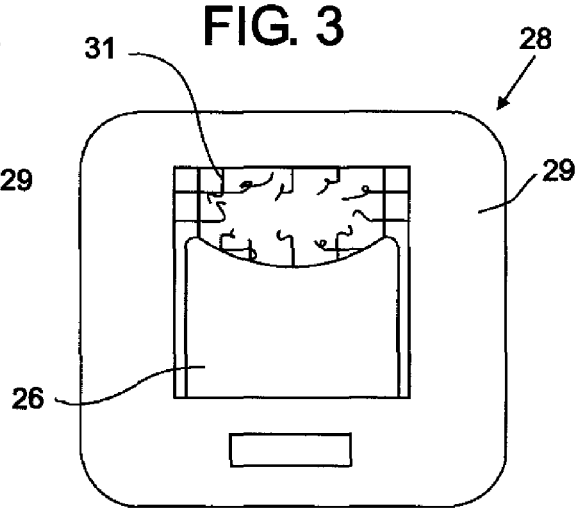
FIG. 3 is an elevation view of the clip of FIGS. 1 and 2 showing a clip which has been the subject of tampering.

Referring now to FIG. 1 through 3, an apparatus 10 is there shown which is an improvement over the clip of the prior patent incorporated by reference into this disclosure by the provision of a tamper evidencing feature. More particularly, the apparatus has a socket body 12 having a planar portion 13, a thin walled protuberance 15 formed integrally with the planar portion and a plurality of leg portions 18, 20 formed integrally with the protuberance 15 and hingedly connected thereto at an end location remote from the planar portion. This structure corresponds generally to that shown in the prior patent. The apparatus 10 has a plug body 28 having a planar portion 29, a thin walled protuberance 30 formed integrally with the planar portion and configured to enter into the socket body, and a latch member 26 formed integrally with and hingedly connected to the planar portion 29. As with the device of the disclosure here incorporated by reference, the plug body protuberance engages the socket body leg portions upon insertion into the socket body, rotating the leg portions to extend outwardly from the socket body protuberance and lock together two pieces of a product package into which the apparatus is inserted.

In accordance with an important feature of this invention, the latch member 26 is joined to the plug body planar portion 29 by a frangible connector 31 which is subject to being broken upon movement of the latch member relative to the plug body planar portion. In these Figures, the embodiment is a plurality of small diameter "threads" forming a net like obstruction of the area of the apparatus into which a user's finger must be inserted to engage and release the latch to permit removal of the clip device. Thus, should an attempt be made to access the product package during handling, the net, shown whole in FIG. 2, would be broken as shown in FIG. 1 and 3, immediately evidencing tampering. In this manner the purpose of this invention is realized.

The present invention contemplates that the socket and plug bodies may be formed integrally one with the other as in the case of the prior patent disclosure. In this case, the bodies are hingedly connected along one side edge of the planar portions, as shown.

Figure 4:
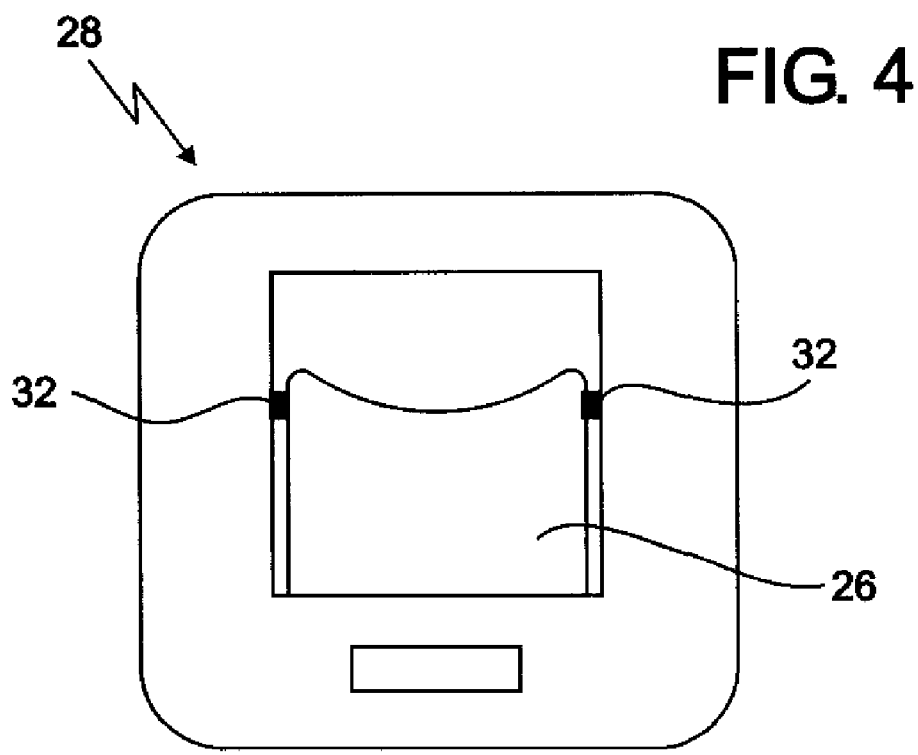
FIG. 4 is an elevation view of a second embodiment of clip in accordance with this invention.
Figure 5:
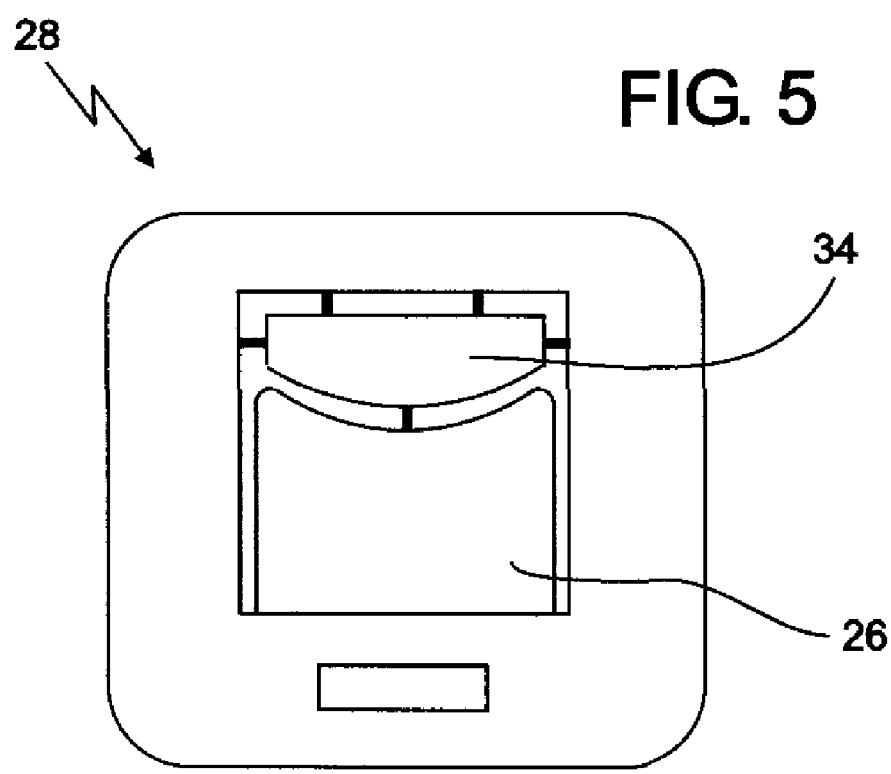
FIG. 5 is an elevation view of a third embodiment of clip in accordance with this invention.
Figure 6:
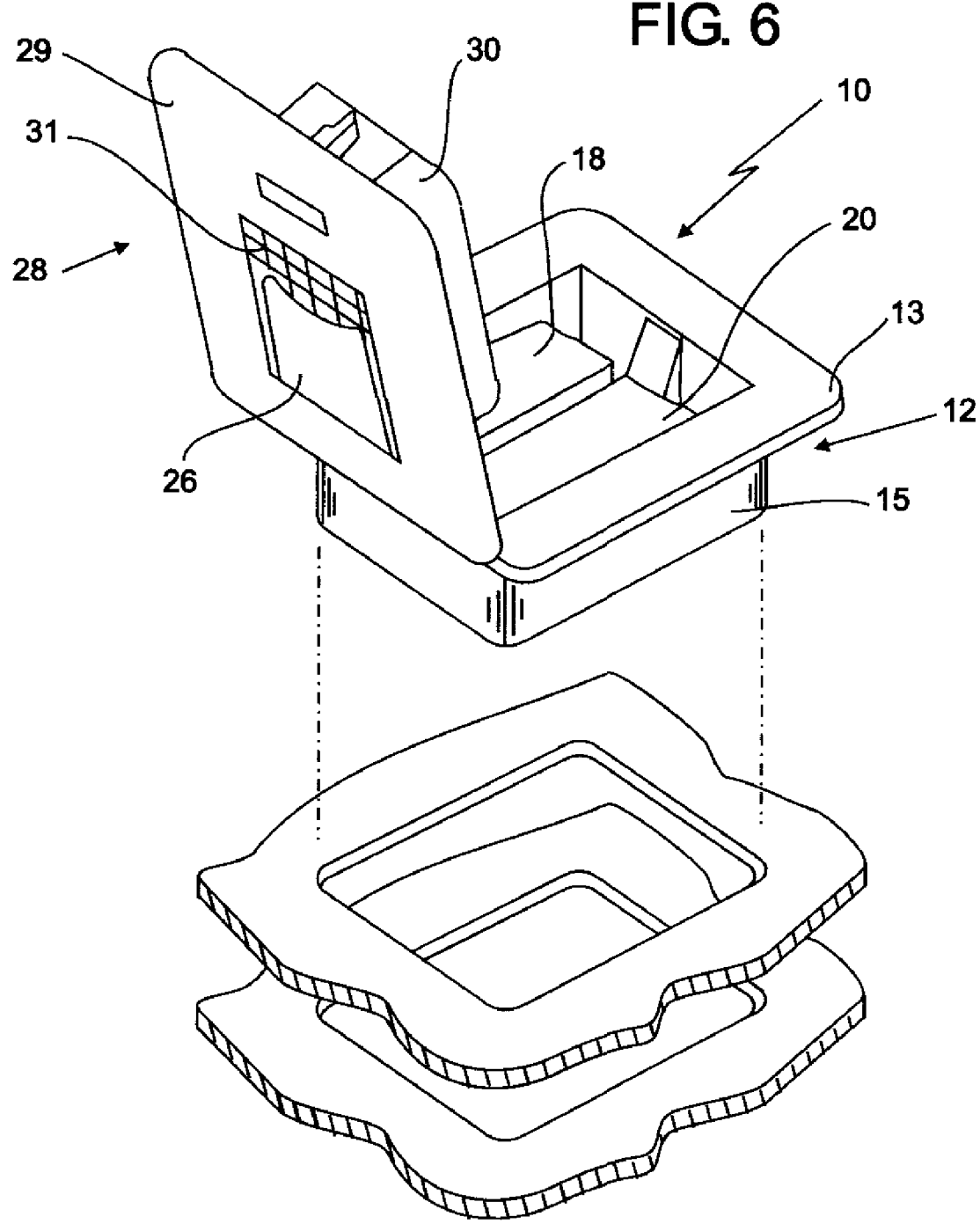
FIG. 6 is a view similar to FIG. 2 of U.S. Pat. No. 6,412,153 showing a portion of a product package and the clip of this invention.

The present invention also contemplates that the frangible connection between the latch and the planar portion of the plug body may be configured in alternate ways, and two of those are shown in FIGS. 4 and 5. In FIG. 4, frangible connectors 32 join side portions of the latch member 26 to adjacent areas of the plug body planar portion the latch member. In FIG. 5, the latch member 26 occludes a portion of the opening in the plug body planar portion which allows entry of a user's finger, and the frangible connector 34 occludes the remaining portion of the opening.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a socket body having a planar portion, a thin walled protuberance formed integrally with said planar portion and a plurality of leg portions formed integrally with said protuberance and hingedly connected thereto at an end location remote from said planar portion; and
   a plug body having a planar portion, a thin walled protuberance formed integrally with said planar portion and configured to enter into the socket body, and a latch member formed integrally with and hingedly connected to said planar portion;

said plug body protuberance engaging said socket body leg portions upon insertion into said socket body and rotating said leg portions to extend outwardly from said socket body protuberance;

said latch member being joined to said plug body planar portion by a frangible connector which is subject to being broken upon movement of said latch member relative to said plug body planar portion said plug body planar portion defining an opening opposite said plug body protuberance and said latch member occluding a portion of said opening, and further wherein said frangible connector comprises a net of strand elements spanning the remaining portion of said opening.

2. Apparatus comprising:

a socket body having a planar portion, a thin walled protuberance formed integrally with said planar portion and a plurality of leg portions formed integrally with said protuberance and hingedly connected thereto at an end location remote from said planar portion; and a plug body having a planar portion, a thin walled protuberance formed integrally with said planar portion and configured to enter into the socket body, and a latch member formed integrally with and hingedly connected to said planar portion;

said plug body protuberance engaging said socket body leg portions upon insertion into said socket body and rotating said leg portions to extend outwardly from said socket body protuberance;

said latch member being joined to said plug body planar portion by a frangible connector which is subject to being broken upon movement of said latch member relative to said plug body planar portion said plug body planar portion defining an opening opposite said plug body protuberance and said latch member occluding a portion of said opening, and further wherein said frangible connector occludes the remaining portion of said opening.

3. Apparatus comprising:

first and second sheets of planar material forming portions of a product package; and a tamper evident fastener penetrating said sheets and holding said sheets together, said tamper evident fastener comprising:

a socket body having a planar portion, a thin walled protuberance formed integrally with said planar portion and penetrating said sheets and a plurality of leg portions formed integrally with said protuberance and hingedly connected thereto at an end location remote from said planar portion;

said leg portions being rotated to extend outwardly from said socket body protuberance to capture said sheets between said socket body planar portion and said legs; and a plug body formed integrally with said socket body and hingedly connected thereto along a common side edge thereof, said plug body having a planar portion, a thin walled protuberance formed integrally with said planar portion and configured to enter into the socket body, and a latch member formed integrally with and hingedly connected to said planar portion;

said plug body protuberance engaging said socket body leg portions; and said latch member being joined to said plug body planar portion by a frangible connector which is subject to being broken upon movement of said latch member relative to said plug body planar portion said plug body planar portion defining an opening opposite said plug body protuberance and said latch member occluding a portion of said opening, and further wherein said frangible connector comprises a net of strand elements spanning the remaining portion of said opening.

4. Apparatus comprising:

first and second sheets of planar material forming portions of a product package; and a tamper evident fastener penetrating said sheets and holding said sheets together, said tamper evident fastener comprising:

a socket body having a planar portion, a thin walled protuberance formed integrally with said planar portion and penetrating said sheets and a plurality of leg portions formed integrally with said protuberance and hingedly connected thereto at an end location remote from said planar portion;

said leg portions being rotated to extend outwardly from said socket body protuberance to capture said sheets between said socket body planar portion and said legs; and a plug body formed integrally with said socket body and hingedly connected thereto along a common side edge thereof, said plug body having a planar portion, a thin walled protuberance formed integrally with said planar portion and configured to enter into the socket body, and a latch member formed integrally with and hingedly connected to said planar portion;

said plug body protuberance engaging said socket body leg portions; and said latch member being joined to said plug body planar portion by a frangible connector which is subject to being broken upon movement of said latch member relative to said plug body planar portion said plug body planar portion defining an opening opposite said plug body protuberance and said latch member occluding a portion of said opening, and further wherein said frangible connector occludes the remaining portion of said opening.

* * * * *